United States Patent
De La Houssaye et al.

(10) Patent No.: US 11,615,318 B2
(45) Date of Patent: *Mar. 28, 2023

(54) NOISE-DRIVEN COUPLED DYNAMIC PATTERN RECOGNITION DEVICE FOR LOW POWER APPLICATIONS

(71) Applicant: The United States Government as represented by the Secretary of the Navy, San Diego, CA (US)

(72) Inventors: Paul R. De La Houssaye, San Diego, CA (US); Benjamin J. Migliori, Santa Fe, NM (US); Adi Ratan Bulsara, San Diego, CA (US); Chriswell Hutchens, San Diego, CA (US); Justin M. Mauger, San Diego, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/384,338

(22) Filed: Jul. 23, 2021

(65) Prior Publication Data
US 2022/0051053 A1 Feb. 17, 2022

Related U.S. Application Data

(63) Continuation of application No. 16/790,567, filed on Feb. 13, 2020, now Pat. No. 11,093,794.

(51) Int. Cl.
*G06N 3/088* (2023.01)
*G06N 3/08* (2023.01)
(Continued)

(52) U.S. Cl.
CPC ........... *G06N 3/088* (2013.01); *G06F 18/214* (2023.01); *G06F 18/21355* (2023.01); *G06N 3/08* (2013.01); *G06V 10/955* (2022.01)

(58) Field of Classification Search
CPC ............ G06N 3/088; G06N 3/08; G06N 3/04; G06N 3/065; G06N 20/00; G06N 3/045;
(Continued)

(56) References Cited

U.S. PATENT DOCUMENTS

| 7,053,610 B2 * | 5/2006 | Clarke | G01R 33/445 324/306 |
| 7,777,535 B1 * | 8/2010 | In | H03B 19/00 327/113 |

(Continued)

OTHER PUBLICATIONS

"A Review of Stochastic Resonance: Circuits and Measurement"; Gregory P. Harmer, IEEE Transactions on Instrumentation and Measurement, vol. 51, No. 2, Apr. 2002 (Year: 2002).*

*Primary Examiner* — Michael S Osinski
(74) *Attorney, Agent, or Firm* — Naval Information Warfare Center, Pacific; Kyle Eppele; J. Eric Anderson

(57) ABSTRACT

A pattern recognition device comprising: a coupled network of damped, nonlinear, dynamic elements configured to generate an output response in response to at least one environmental condition, wherein each element has an associated multi-stable potential energy function that defines multiple energy states of an individual element, and wherein the elements are tuned such that environmental noise triggers stochastic resonance between energy levels of at least two elements; a processor configured to monitor the output response over time and to determine a probability that the pattern recognition device is in a given state based on the monitored output response; and detecting a pattern in the at least one environmental condition based on the probability.

20 Claims, 10 Drawing Sheets

(51) Int. Cl.
*G06V 10/94* (2022.01)
*G06F 18/2135* (2023.01)
*G06F 18/214* (2023.01)

(58) Field of Classification Search
CPC ........ G06N 3/044; G06N 3/063; G06N 3/082; G06N 7/01; G06F 18/21355; G06F 18/214; G06F 18/24; G06F 2218/00; G06V 10/955; G05B 23/024; G05B 23/0235

See application file for complete search history.

(56) References Cited

U.S. PATENT DOCUMENTS

| | | | | |
|---|---|---|---|---|
| 7,907,784 B2* | 3/2011 | Gladkova | ................. | G06T 9/00 |
| | | | | 382/254 |
| 8,049,570 B1* | 11/2011 | In | ......................... | G01R 33/093 |
| | | | | 331/49 |
| 8,212,569 B1* | 7/2012 | In | ......................... | G01R 29/12 |
| | | | | 324/72 |
| 8,994,461 B1* | 3/2015 | In | ......................... | H03K 3/0322 |
| | | | | 331/46 |
| 9,084,559 B2* | 7/2015 | Sumi | ...................... | A61B 8/485 |
| 9,140,765 B1* | 9/2015 | Bulsara | .............. | G01R 33/0029 |
| 9,755,133 B1* | 9/2017 | Nayfeh | ................... | H01L 27/18 |
| 9,995,778 B1* | 6/2018 | Fiori, Jr. | ............. | G01R 27/2611 |
| 10,401,396 B2* | 9/2019 | Choi | ..................... | G01R 33/02 |
| 11,005,421 B2* | 5/2021 | Ogihara | .................. | H03B 5/12 |
| 2004/0135535 A1* | 7/2004 | Kunzel | ................ | F16F 15/005 |
| | | | | 318/611 |
| 2005/0177080 A1* | 8/2005 | Yasuhara | ............ | A61H 1/0244 |
| | | | | 602/16 |
| 2006/0008119 A1* | 1/2006 | Chang | ....................... | G06T 7/74 |
| | | | | 382/103 |
| 2007/0144254 A1* | 6/2007 | Handrich | ........... | G01C 19/5726 |
| | | | | 73/504.12 |
| 2008/0151229 A1* | 6/2008 | Hill | ..................... | G03F 7/70775 |
| | | | | 356/73 |
| 2010/0045113 A1* | 2/2010 | Hishikawa | ......... | G01R 33/3614 |
| | | | | 307/77 |
| 2011/0068875 A1* | 3/2011 | Hotta | ................... | H03K 3/0315 |
| | | | | 331/57 |
| 2011/0091126 A1* | 4/2011 | Brajovic | ................. | G06T 5/50 |
| | | | | 382/266 |
| 2013/0218815 A1* | 8/2013 | Nugent | .................. | G06N 20/00 |
| | | | | 706/12 |
| 2013/0240728 A1* | 9/2013 | Albiol | ................ | G01N 23/2251 |
| | | | | 250/305 |
| 2015/0019468 A1* | 1/2015 | Nugent | ................ | G06N 3/0418 |
| | | | | 901/46 |
| 2015/0084704 A1* | 3/2015 | In | ......................... | H03K 3/0322 |
| | | | | 331/52 |
| 2017/0039467 A1* | 2/2017 | Ma | ......................... | G06N 3/049 |
| 2018/0087984 A1* | 3/2018 | Hagelin | ................ | G01L 9/001 |
| 2018/0341244 A1* | 11/2018 | Xu | ......................... | G06N 20/00 |
| 2019/0104371 A1* | 4/2019 | Ballande | ................ | H04R 25/554 |
| 2019/0385004 A1* | 12/2019 | Jiang | ....................... | G06N 3/08 |
| 2019/0385050 A1* | 12/2019 | Wang | ....................... | G06N 3/04 |
| 2020/0117177 A1* | 4/2020 | Cantrell | ................. | G06N 5/04 |
| 2020/0210825 A1* | 7/2020 | Szurley | ................ | G06N 3/0454 |
| 2020/0269688 A1* | 8/2020 | Dagley | ................... | H04L 67/12 |
| 2021/0064141 A1* | 3/2021 | Németh | .................. | G06N 3/08 |
| 2021/0133559 A1* | 5/2021 | Freed | ................... | G05B 23/024 |
| 2021/0201123 A1* | 7/2021 | Grollier | ................. | G06N 3/049 |
| 2022/0051053 A1* | 2/2022 | De La Houssaye | . | G06K 9/6256 |
| 2022/0292385 A1* | 9/2022 | Sauvage | ................ | G06N 3/045 |

* cited by examiner

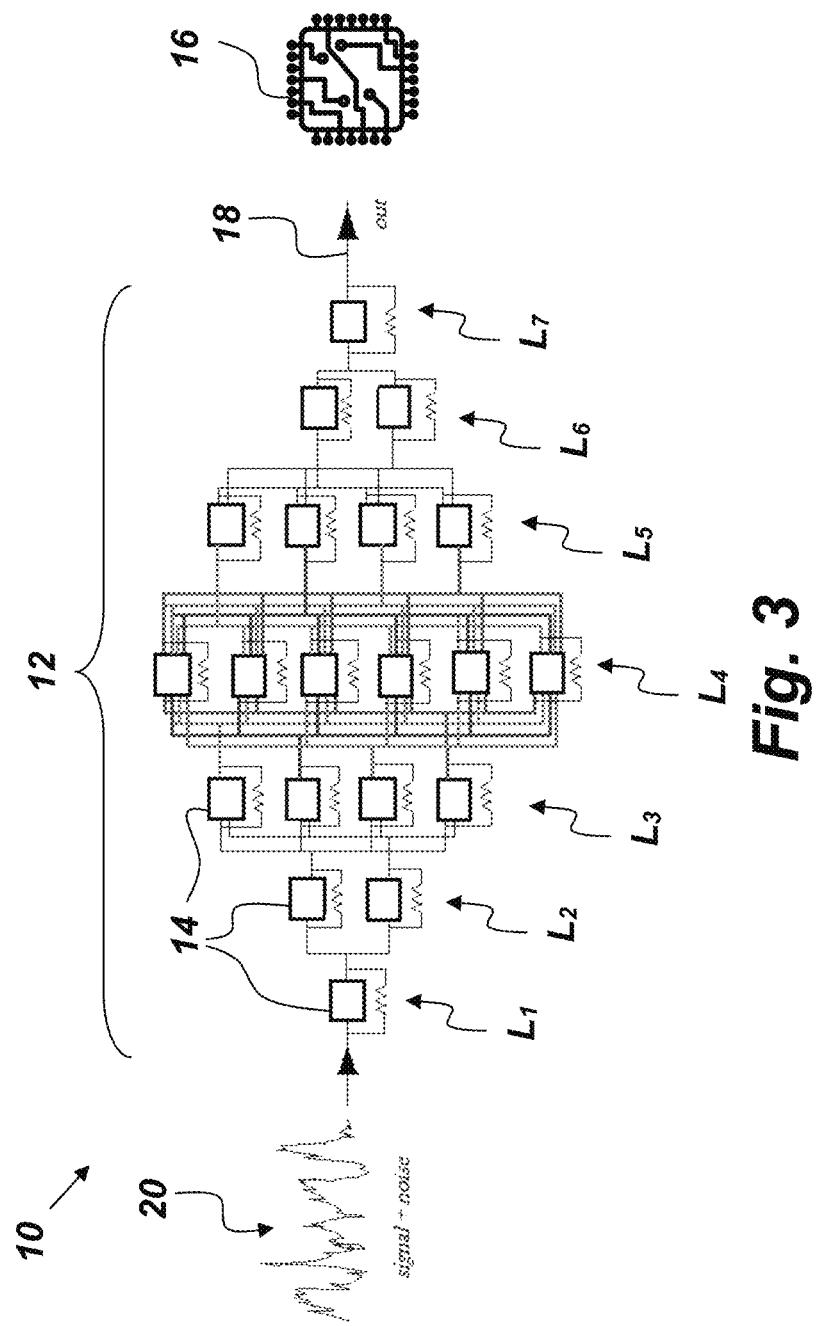

NOISE-DRIVEN COUPLED DYNAMIC PATTERN RECOGNITION DEVICE FOR LOW POWER APPLICATIONS

CROSS-REFERENCE TO RELATED APPLICATION

This application is a continuation of prior U.S. application Ser. No. 16/790,567, filed 13 Feb. 2020, titled "Noise-Driven Coupled Dynamic Pattern Recognition Device for Low Power Applications" (Navy Case #108646).

FEDERALLY-SPONSORED RESEARCH AND DEVELOPMENT

The United States Government has ownership rights in this invention. Licensing and technical inquiries may be directed to the Office of Research and Technical Applications, Naval Information Warfare Center Pacific, Code 72120, San Diego, Calif., 92152; voice (619) 553-5118; ssc_pac_t2@navy.mil. Reference Navy Case Number 210461.

BACKGROUND OF THE INVENTION

Machine learning, in its third incarnation, enables the use of large, readily available computational power to perform highly data-driven analyses on complex data sets to recognize patterns in those data sets. However, in many practical situations/applications, power is limited. Under these scenarios, the advantages of the mammalian nervous systems become obvious. For example, in a large mammal like *Homo sapiens*, the central nervous system consumes on the order of 20 W (See A. Peters, U. Schweiger, L. Pellerin, C. Hubold, K. Oltmanns, M. Conrad, B. Schultes, J. Born, and H. Fehm, "The selfish brain: Competition for energy resources", *Neuroscience & biobehavioral reviews*, vol. 28, no. 2, pp. 143-180, 2004). This indicates processing efficiency orders of magnitude better than the state of the art in conventional GPU-based machine learning, where a single device can consume 500 W or more, where the Landauer limit (See R. Landauer et al., "Information is physical", *Physics today*, vol. 44, no. 5, pp. 23-29, 1991.) on logic operations defines a lower limit of kT In 2 for a binary system. Hence there is a need for an improved, low-power pattern recognition device.

SUMMARY

Described herein is a pattern recognition device comprising a coupled network of damped, nonlinear, dynamic elements and a processor. The dynamic elements are configured to generate an output response in response to at least one environmental condition. Each element has an associated multi-stable potential energy function that defines multiple energy states of an individual element. The dynamic elements are tuned such that environmental noise triggers stochastic resonance between energy levels of at least two elements. The processor is configured to monitor the output response over time, to determine a probability that the pattern recognition device is in a given state based on the monitored output response over time, and to detect a pattern in the at least one environmental condition based on the determined probable state of the pattern recognition device.

The pattern recognition device is also described herein as a sensor comprising a coupled network of damped, nonlinear, dynamic circuit elements and a processor. The dynamic elements are configured to generate an output signal in response to at least one environmental condition. Each circuit element has an associated multi-stable potential energy function that defines multiple energy states of an individual circuit element. The circuit elements are tuned such that environmental noise triggers stochastic resonance between energy levels of at least two circuit elements. The processor is configured to monitor the output signal over time and to determine a probability that the sensor is in a given state based on the monitored output signal.

Also described herein is a method for recognizing a pattern amidst environmental noise comprising the following steps. The first step provides for coupling a network of damped, nonlinear, dynamic elements so as to generate an output response in response to at least one environmental condition input. Each element has an associated multi-stable potential energy function that defines multiple energy states of an individual element. The next step provides for tuning the elements such that environmental noise is used to drive stochastic resonance between states of at least two individual elements. The next step provides for monitoring the output response over time. The next step provides for determining a probability that the coupled network of damped, nonlinear, dynamic elements is in a given state based on the monitored output response. The next step provides for detecting a pattern in the environmental condition input based on the probability.

BRIEF DESCRIPTION OF THE DRAWINGS

Throughout the several views, like elements are referenced using like references. The elements in the figures are not drawn to scale and some dimensions are exaggerated for clarity.

FIG. 3 is an illustration of an embodiment of a pattern recognition device.

DETAILED DESCRIPTION OF EMBODIMENTS

The disclosed device and method below may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other methods and systems described herein as will be understood by one of ordinary skill in the art unless otherwise stated specifically.

Figures 1A, 1B:
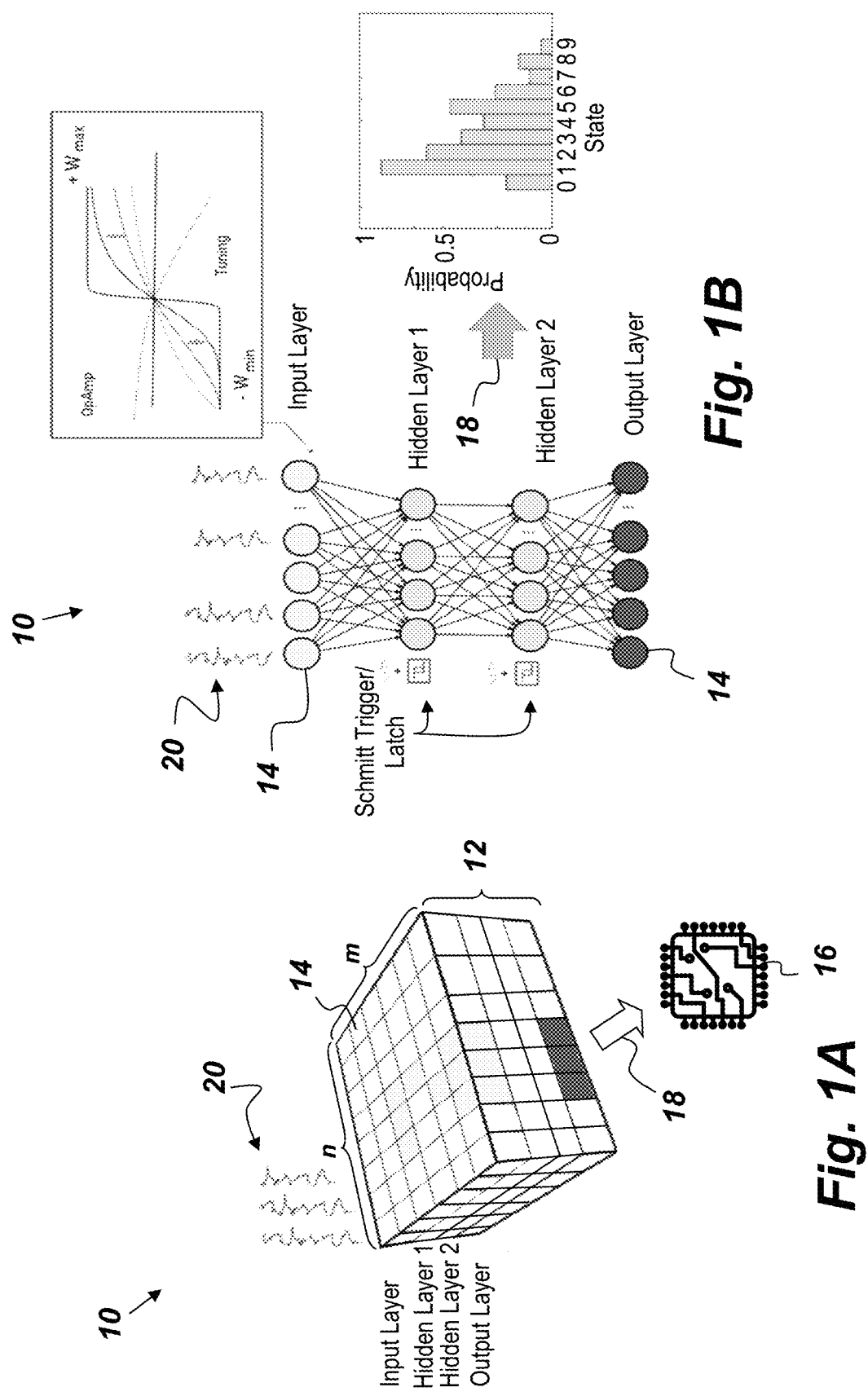
FIG. 1A is a perspective view illustration of an embodiment of a pattern recognition device.
FIG. 1B is a schematic view illustration of an embodiment of a pattern recognition device.

FIGS. 1A and 1B are respectively perspective view and schematic view illustrations of an embodiment of a pattern recognition device 10 that comprises, consists of, or consists essentially of a coupled network 12 of damped, nonlinear, dynamic elements 14 and a processor 16. The coupled network 12 is configured to generate an output response 18 in response to at least one environmental condition input 20. Each element 14 has an associated multi-stable potential energy function that defines multiple energy states of an individual element 14. The pattern recognition device 10 is configured such that at least two dynamic elements 14 will randomly switch states over time due to noise. This noise can be injected into the pattern recognition device 10 or may consist of inherent noise in the coupled network 12 or a combination of both. Examples of such noise include, but are not limited to, Johnston noise, shot noise, 1/f noise, and burst noise. The energy function of a given element 14 is a function of inputs to the given element 14 as well as a function of inputs and outputs of other elements in the coupled network 12. The functional dependence of the elements on the other elements is governed by a weighting or coupling factor which can be either non-linear or linear in nature. The weighting or coupling factor may be adjusted or tuned a priori or in real-time such that the output 18 has a desired probability distribution given a specific environmental condition input 20. The pattern recognition device 10 may learn how to adjust the coupling factor a priori to operation (e.g., in a teaching/learning environment), in real-time during operation, or through a combination of offline and real-time learning.

The embodiment of the pattern recognition device 10 shown in FIGS. 1A and 1B comprises a desired number of n×m arrays of dynamic elements 14. Each n×m array may also be referred to as a level or layer. For each layer, n and m may be different, and each layer may be arranged in other configurations other than a square layout, such as a hexagon pattern, etc. In the embodiment shown in FIGS. 1A and 1B, the dynamic elements 14 are under-biased op-amps, which can be arranged either in a vector formation (i.e., where m or n is equal to 1) or in matrix form (e.g., the input layer shown in FIG. 1A). Each dynamic element 14 is in turn coupled to one or more dynamic elements 14 of the subsequent n×m array such as the coupling shown between the dynamic elements 14 in the input layer and the dynamic elements 14 of the hidden layer 1 shown in FIGS. 1A and 1B. In the embodiment of the pattern recognition device 10 shown in FIGS. 1A and 1B, the different layers of dynamic elements 14, in this case are subthreshold-biased op-amps, coupled together in a latching configuration. However, it is to be understood that different circuit elements preforming a similar function may be used for the dynamic elements 14. Referring back to FIGS. 1A and 1B, the first hidden layer is followed by another array of dynamic elements 14 (i.e., hidden layer 2), which is tuned to a learned, or previously predefined, Schmitt trigger or other type of function making the device have one or more quasi-stable states and giving it a feed forward direction. The second hidden layer is followed by an n×m array output layer. A minimum number of dynamic elements 14 may be established such that the pattern recognition device 10 is capable of sufficiently encoding information. The number of dynamic elements 14 may be increased until a desired number of states (or classes) is reached.

The various layers of dynamic elements 14 depicted in FIGS. 1A and 1B may be likened to layers of "slow" and "fast" neurons in a biological system, which neurons are selectively and sequentially layered and coupled in such a way that x number of layers follow non-linear behaviors defined in Equation 4 below. Each element of the fast or slow network can independently be tuned with the input signal and inherent noise such that the output layer will exhibit the desired probability distribution making the desired state as the most probable. The fast and slow layers of neurons may be architecturally identical and process identical input information, however, the number and the coupling of fast and slow layers in the physics-enhanced pattern recognition device 10 may be selected experimentally, so that minimum time is required to settle into most probable states.

Figure 2A:
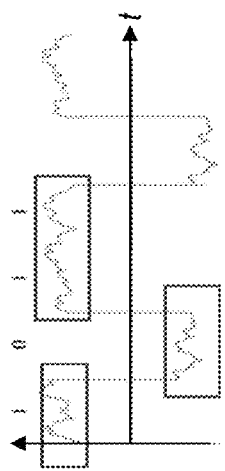
FIG. 2A is a plot of system-state over time for a single dynamic element.
Figure 2B:
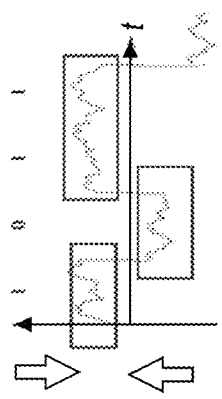
FIG. 2B is a plot of system-state over time for a single dynamic element.
Figure 2C:
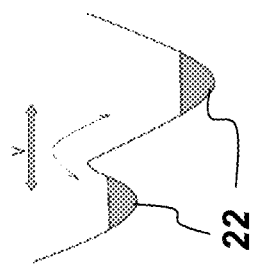
FIG. 2C is an illustration of a two-state dynamic element represented by two wells.

FIGS. 2A-2B are plots of system-state over time for a single dynamic element 14. FIG. 2C is an illustration of a two-state dynamic element 14 represented by two wells 22. Induced noise may be used to tune the fast and slow interlayers of the dynamic elements 14 of the pattern recognition device 10 in random manner and with predefined or learned coupling such as is shown in FIG. 2A. The bias of the system may be reduced (such as is shown in FIG. 2B) to improve energy efficiency.

By way of example, the pattern recognition device 10 may be tuned by adjusting weighting factors through the modification of circuit resistances or biases on a semiconductor device, or though magnetic coupling, or even through variation of the quantum mechanical coupling between elements such as might be seen in a superconducting circuit. The processor 16 is configured to monitor the output response 18 over time and to determine a probability that the pattern recognition device 10 and/or any given dynamic element 14 is in a given state based on the monitored output response 18 over time. The processor 16 may also be configured to detect a pattern in the environmental condition input 20 based on the determined probable state of at least one of the dynamic elements 14.

The dynamic elements 14 may be any nonlinear multi-stable element with at least two states. Suitable examples of the dynamic elements 14 include, but are not limited to, non-linear oscillators, under-driven inverters, non-linear circuit elements (e.g. op-amps, especially under-driven op-amps), clamped buckling beams, volatile CMOS memristors, Josephson junctions and/or other combinations of superconducting quantum interference devices (SQUIDs), ferroelectric capacitors, and dynamic ferromagnetic cores. Each nonlinear dynamic element 14 may be over-, under-, or critically-damped. Further, the interactions of the coupled dynamic elements 14 may be embodied as arbitrary stochastic or non-stochastic differential equations, depending on the exact configuration of the dynamic elements 14. The defined inputs 20 may directly or indirectly alter the coupling between the elements 14, either through direct interaction, or though time-damped interaction whereby the interaction includes some integrated memory of the past inputs-a more slowly changing function of the input(s) 20.

Feedback from the processor 16 may be used in conjunction with an expected or desired output of the processor 16 to alter the coupling between the elements 14, directly or indirectly, and may include some form of internal or external calculation. The dynamic elements 14 may perform the integration function themselves. The dynamic elements 14 may be components of a system designed for clustering, predicting, optimizing, or separating information. The coupling between the dynamic elements 14 may, at least in the case of a critical set of the group of elements 14, induce a hysteretic change in the coupling such that learning, or a recording of aspects of the inputs over time, occurs. This hysteretic change may be gradual or immediate, and may, over a number of cycles, approach the desired values. In other words, the change may not always be instantaneous or in the desired direction, but only over time do the desired values of the coupling emerge.

In one embodiment, the sequence of the states of the coupled network 12 may itself alter the coupling strengths between the elements 14, either directly or via an integration over time. In one embodiment of the pattern recognition device 10, thermal or other noise is used to induce state changes between potential energy regions of at least two of the dynamic elements 14. In one embodiment, energy via photons (e.g., light of the visible or non-visible spectrum) is transferred to the coupled network 12 to impart a given energy flux to individual dynamic elements 14. Similarly, interactions may be accomplished via electromagnetic or mechanical inputs.

The processor 16 may be any device capable of monitoring the output 18 over time and determining the probability that the pattern recognition device 10 is in a given state. Suitable examples of the processor 16 include, but are not limited to: a general purpose computer, a logic circuit, a simple sampling circuit, and a boxcar integrator. In another example embodiment, the processor 16 may be an animal or human, which would be able to discern states of a system optically, audibly, or tactilely.

The input 20 to the coupled network 12 alters the probability of some (or all) of the elements 14 being in a given state, either through direct coupling to the elements 14 (e.g., through biasing with an external signal) and/or through its effect on the coupling dynamics. For example, in a coupled-core magnetometer, the nonlinear elements are coupled ferromagnetic cores, and the bias signal is an external target magnetic flux. An electric field sensor is similarly realizable by coupling ferroelectric capacitors, with the bias signal being an electric field. In the case of an electrical circuit, biasing may be performed via an accumulated electrical charge due to a photon flux in the region of the first layer through the use of a charge-coupled device (CCD) or other optical detector device overlay array to each dynamic element 14. Thus, the data from an image (stable or itself changing over time) could be focused on such a layer and transferred to the coupled network 12 such as is depicted in FIG. 1.

The thresholds (energy barriers) for state change of the dynamic elements 14 are configured such that even when the input 20 is low-level noise (thermal, electrical, acoustic, optical, etc.) the input 20 is capable of causing state changes. Inputs are typically composed of both noise and signal. This stochasticity allows the pattern recognition device 10 to probabilistically explore allowed states with minimal power consumption. Computation occurs by observation by the processor 16 of the state of the whole coupled network 12 over time, and by determining the most probable state or states of individual dynamic elements 14 and/or the coupled network 12. Memory is held within the coupled network 12 through the changing of the coupling and/or potential energy functions of the various elements 14 of the coupled network 12, thus changing the response of the coupled network 12 as a whole. As opposed to traditional computation where a set of inputs produce a specific output and any change from that output is an error, the coupled network 12 produces a non-deterministic output from which one or more modes (as opposed to medians) of the coupled network 12 may be computed, from which the "answer" is gleaned. This not to suggest that medians are not calculable. This "answer" will be in the form of a learned energy configuration resulting in desirable properties given an external set of constraints that describe the "problem", and are imposed on the physical coupled network 12 to induce computation.

A simple version of a nonlinear dynamic overdamped element 14 is described by the dynamics:

$$\tau \dot{x} = \frac{-\partial U(x)}{\partial x} \qquad \text{(Eq. 1)}$$

with $U(x)$ being a nonlinear potential energy function that characterizes the dynamics of the state variable $x$, and $\tau$ being a system time-constant. For the case of a bistable system, the function $U(x)$ admits two stable steady states, separated by an unstable fixed point. A good example of a bistable potential energy function is:

$$U(x) = \frac{x^2}{2} - c\ln(\cosh(bx)) \qquad \text{(Eq. 2)}$$

which consists of a parabolic term (i.e., $x^2/2$, leading to linear dynamics in the differential equation of motion) on which is superimposed a nonlinear term (i.e., $-c \ln(\cosh(bx))$. The variables b and c depend on the type of dynamic element 14 being used. For example, in a magnetic system, variables b and c would be determined by the material properties of the ferromagnetic core.

The potential function of Equation 2 may be used in a reductionist description of single neuron dynamics (x can represent a cell membrane potential). The dynamics of x can, then, be written as:

$$\tau \dot{x} = -x + cb \tan h\, bx. \qquad \text{(Eq. 3)}$$

The parameter b can be adjusted to render the slope of the hyperbolic tangent at the origin as steep as required, so that the dynamics come very close to describing a (near discrete) two-state system. The ratio b/c dictates whether the nonlinear elements are a priori bistable (the potential function has two stable steady states separated by an unstable saddle point) or not. We now present the (coupled) dynamics for an N-element fully coupled network 12 of elements 14 of the form:

$$C_i \frac{dx_i}{dt} = \sum_{i,j=1}^{N} J_{ij} \tanh x_j - \frac{x_i}{R_i} + N_i(t) \qquad \text{(Eq. 4)}$$

in which we have introduced a circuit representation of each network element 14 in terms of resistors ($R_i$), capacitors ($C_i$), and a nonlinearity that could be realized using op-amps. The coupling coefficients are realized by appropriate circuit elements and $N_i(t)$ represents a noise floor in each circuit element. In the most general case, the coupling coefficients have small fluctuating components (i.e., $J_i(t)=J+\delta J_i(t)$) where we will assume the random components to be Gaussian and delta-correlated with variance $\sigma^2$.

Depending on the complexity of the problem, one can assume that the coupling coefficients are initially uncorrelated amongst themselves meaning that:

$$\delta J_i(t)\delta J_k(s) \approx \sigma^2 \delta_{ik} \delta(t-s) \qquad \text{(Eq. 5)}$$

The ability of a state element 14 to surmount the energy barrier between its two stable states predicates the information transmissivity of the coupled network 12. Noise (especially Gaussian noise) can, in fact, cause individual elements 14 to switch states (e.g., the Kramers problem in statistical physics). However, usually one wishes to examine the network response to a weak deterministic external signal which, in its simplest form, can be taken to be a sinusoid $S(t)=A \sin \omega t$. The signal amplitude A is taken to be much smaller than the deterministic switching threshold for an individual (uncoupled) element 14 in the coupled network 12. The input signal 20 can be applied to every element 14 in the coupled network 12, or to a select number. In both cases, it will influence many elements 14 each of which will be noisy and near a transition threshold. Thus, stochastic cooperative phenomena, e.g. stochastic resonance, is important to the pattern recognition device 10 and can actually aid in information transfer. This is also beneficial from the point of view of machine learning, as it is desirable for no single network element 14 to be completely informative during the inference process. By allowing variability in activation, as in networks with dropout or other stochastic elements, the pattern recognition device 10 learns distributed robust representations of the generating phenomena within a data set under analysis. Whereas a single receptor element 14 might not be able to detect the signal (if its amplitude is smaller than the energy barrier), a globally coupled network 12 should be able to utilize such stochastic effects to propagate signal information through the network 12.

To determine the configuration of the network 12, best practices from fully connected and convolutional network research may be employed. However, the state space of such a network is very large, and made more complex by memory effects (hysteresis) and, of course, coupling. Hence, some theoretical analyses, hand-in-hand with simulations, may be employed.

One example approach that may be used by the processor 16 to determine the configuration of the network 12 is to assume that a single network element having a longer time constant (in this case the value $R_iC_i$) can be used as the readout or "master" element. In this case, the remaining N−1 elements constitute a "heat-bath". In a biological example, one could imagine a cell receiving input from a large number of dendrites with far smaller time-constants between the cell and the dendritic tree; in this case, the dendrites would constitute the "heat-bath". Alternatively, our representation could pertain to a single cell coupled to a "bath" of other cells but having a far slower time-constant than the bath. Then, the time-scale separation into "fast" and "slow" variables becomes analogous to a mean field description in an Ising ferromagnet. The processor 16 can then perform a systematic adiabatic elimination of the "fast" (i.e. bath) elements 14, by exploiting the above-mentioned disparity in timescales. In the presence of noise, this is done by determining an N-body Fokker Planck Equation (FPE) for the probability density function $P(\{x_i\}, t)$. Then, the probability density can be factorized into a product of slow (taken to be the variable $x_1$) and fast components:

$$P(\{x_i\},t)=h(x_2,x_3,x_4\ldots \vee x_1,t)g(x_1,t) \qquad \text{(Eq. 6)}$$

whence the FPE can be factorized into a transport equation for the slow element $x_1$ and an equation for the bath density function $h(x_2, x_3, x_4 \ldots \vee x_1, t)$. The latter can be integrated using a local equilibrium assumption, and the solution used to obtain the reduced FPE for $g(x_1, t)$, whence one can obtain steady state moments via direct integration or, by inspection, determine an "effective" stochastic differential equation for $x_1(t)$ which can be integrated numerically.

It should be noted that the reduced dynamics for the density function $g(x_1, t)$ will contain contributions from other network elements 14, so that the final solution for the stochastic quantity $x_1(t)$ or any other output measure (e.g., a power spectral density, or threshold crossing rate) does, in fact, depend on the entire network 12. It is also worth pointing out that, with fluctuating coupling coefficients, the phase space defined by the coupling and noise is extremely rich. In particular, the interplay between noise and coupling can lead to multistable (including monostable, bistable, or higher order) dynamics.

The pattern recognition device 10 operates in a parameter regime where thermal noise can drive state transitions. A "noisy" system, monitored over time, will exhibit certain local equilibrium (metastable) behaviors that can be described in phase space. If the individual elements making up the system are hysteretic, then the system may drift from fixed point to fixed point driven by ambient fluctuations. The pattern recognition device 10 may be architected in a similar configuration to a quantized deep learning network, where each element 14 has two or more states (binary or multistate) that are accessible through the noise fluctuations, directional stochastic fluctuations in the state variable will be observed as "input" layer neurons randomly change states together, coupling to downstream layers. Under random inputs in the presence of hysteresis, the changes induced by these fluctuations will, over a given period of time, equilibrate. However, if a weakly deterministic input signal is coupled to the input layer of the coupled network 12, the coupled network 12 can settle into a different fixed point (predicated by the strength of the input signal 20 and its interplay with the fluctuations and nonlinearity) in phase space. This type of forward propagating information, mediated by hysteresis, represents a form of Hebbian learning that has been implemented in other systems such as memristor crossbars. In a large enough embodiment of the pattern recognition device 10, repeated presentations drawn stochastically from some generative process will result in unsupervised feature extraction such that inputs from various process classes will induce characteristic responses in the dynamic system with some probability.

It should be noted that the coupled network 12 will not likely settle into a completely stable state in many instances. Over time, the coupled network 12 will be found in different states, each with different probabilities that are functions of the total energy level of the whole system, the coupling connectivity and strengths, and the externally applied constraints or biases. Because the difference in energy levels of the states of each individual element 14 will be on the order of the noise power, determining the system response to input signals will require repeated sampling over time. This repeated sampling will determine the most likely set of state(s): in essence, the mode of the coupled network 12. By computing the mode(s), noise contributions to the output state will be minimized without the loss of state-specificity that would be induced by computing an average.

The pattern recognition device 10 can learn through the process of the coupled network 12 trending towards the lowest energy state under multiple sets of constraints. Supervision can be introduced by altering those constraints. The pattern recognition device 10 may be trained by coupling an expected result to the output 18 of the coupled network 12, and coupling a known input matching the expected result to the input 20. By biasing the coupled network 12 to settle in this configuration we improve the likelihood that, on presentation of another example, the network 12 will output a predictable result as its most probable state. The exact information path through the coupled network 12 will still be stochastic, but after many presentations of training and label data, the coupled network 12 would have transited phase space to a region relatively immune to small (compared with the energy barrier height) random fluctuations—and therefore unlikely to be perturbed by new data during inference. The output 18 will vary with time about a value centered on a peak in the probability distribution, and the "right" answer would arise from observing the mode of the system output state. The output 18, which one could characterize as an experimental observation, will be the most likely state of the system given a specific input, projected to some small state space.

FIG. 3 is an illustration of a physics-enhanced embodiment of the pattern recognition device 10 that combines layers ($L_1$-$L_7$) of dynamic elements 14 that may be compared to "slow" and "fast" neurons that create an information "bottleneck" condition, which condition is discussed in the paper "Deep Learning and the Information Bottleneck Principle" by Naftali Tishby and Noga Zaslavsky. Each layer ($L_1$-$L_7$) represents the dynamic elements 14 that can auto-encode information by using a minimum number of elements 14. The benefit of auto-encoding is that it is possible to tune elements 14 in the "bottleneck" to achieve desired non-linear dynamics of the coupled network 12. Physics-enhanced coupling between fast and slow layers can be done between "bottleneck" elements.

Figure 4:
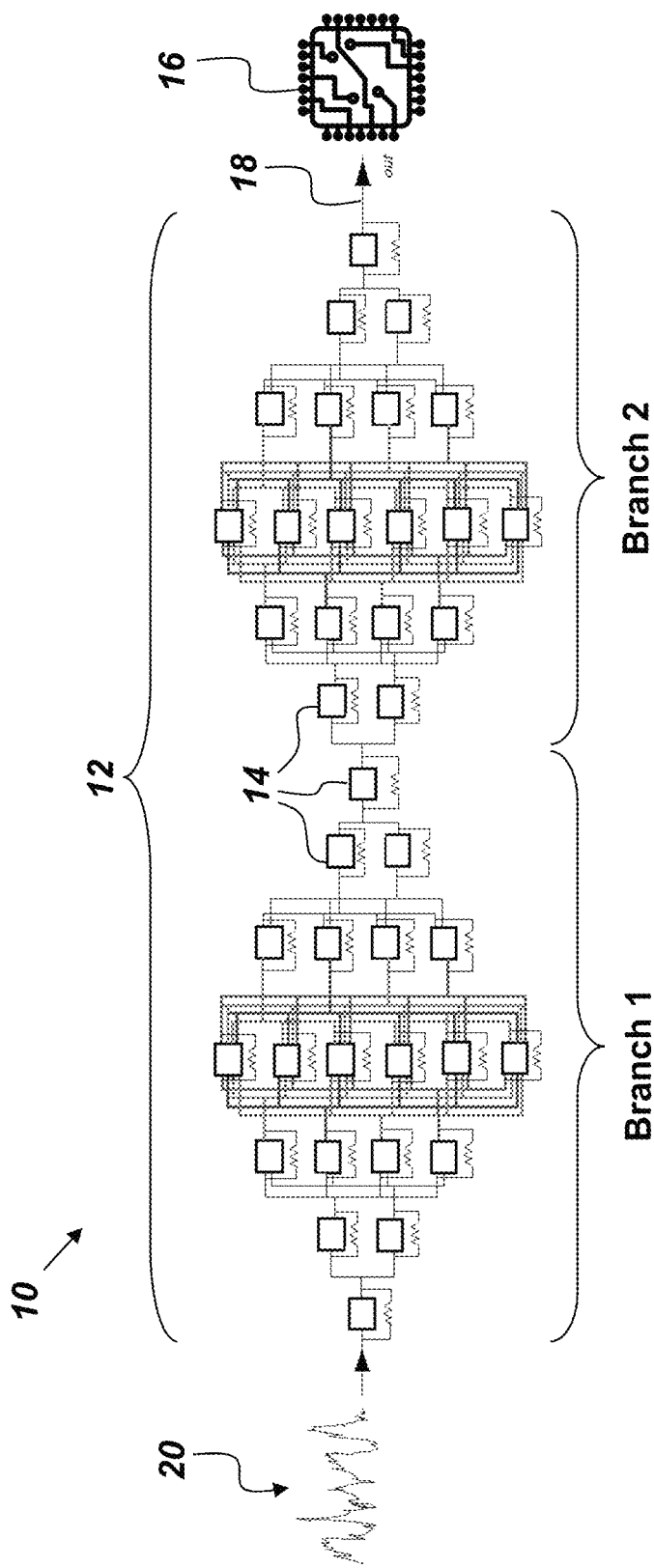
FIG. 4 is an illustration of an embodiment of a pattern recognition device.

FIG. 4 is an illustration of an embodiment of the pattern recognition device 10 having a double feed forward layer network 12 of non-linear elements 14. The pattern recognition device 10 has extremely low power requirements compared to other machine learning approaches due to using weak coupling to inputs and training outputs, and allowing state changes to be driven stochastically by noise. The noise presents a computational benefit as well; by "tuning" the system near a critical point (as is known in the art and disclosed in the paper "Emergent complex neural dynamics" by Dante R. Chialvo), the noise will produce cooperative behavior, e.g. stochastic resonance, and push the coupled network 12 into different dynamical regimes. This stochasticity also prevents the network from learning a fixed representation. By learning in a feedforward manner, the pattern recognition device 10 will be adaptive (slowly or quickly depending on the hysteresis parameters) to inputs. This enables adaptivity in place and over time, a critical aspect often missing in low power machine learning implementations.

Figure 5:
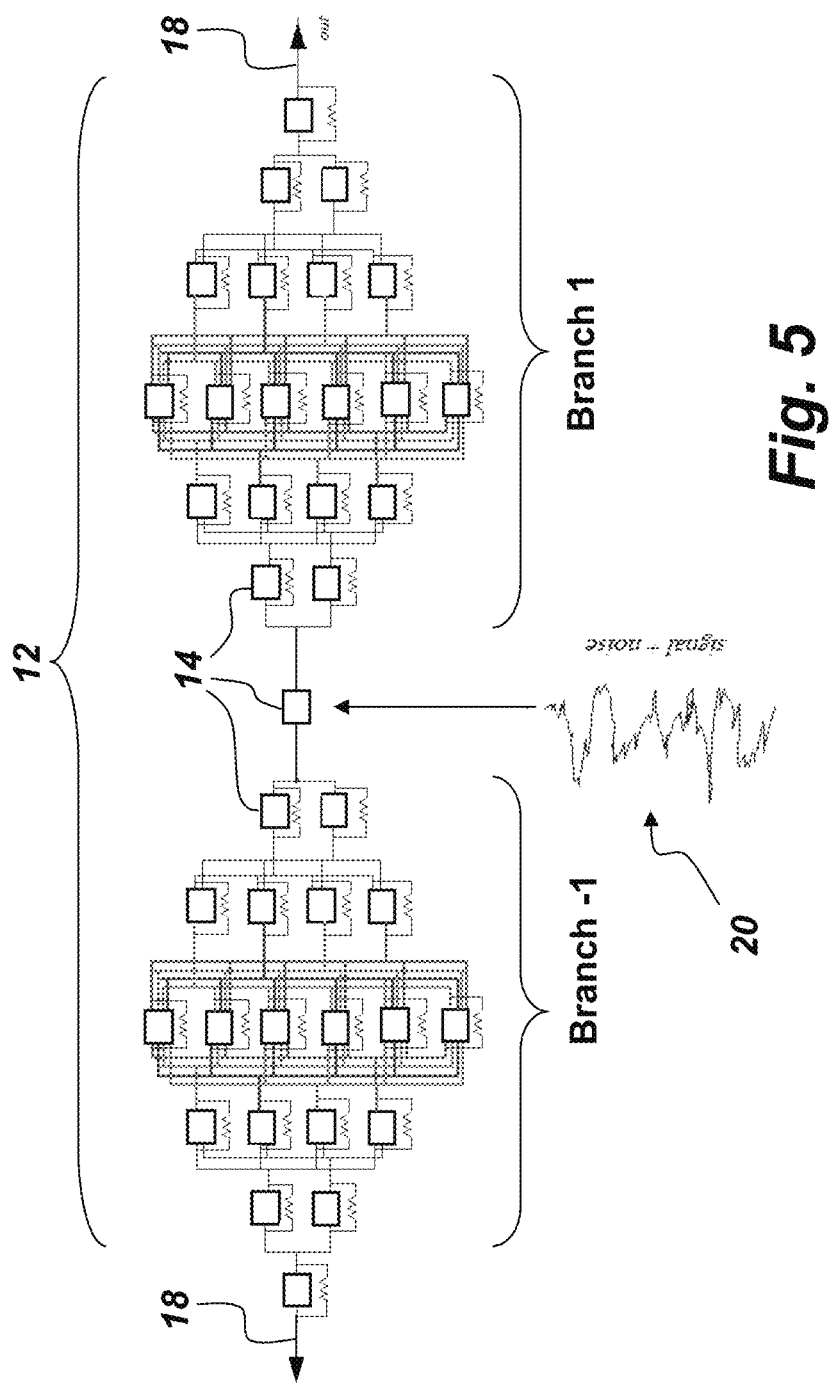
FIG. 5 is an illustration of an embodiment of a pattern recognition device.

FIG. 5 is an illustration of a symmetrical embodiment of the coupled network 12 comprising combined identical branches of layers (i.e., Branches −1 and 1) of fast or slow dynamic elements 14. This embodiment of the pattern recognition device 10 propagates input signal 20 with variable degrees of probability (for example: 10/90, 50/50, 60/40 etc.). In other words, this embodiment of the pattern recognition device 10 is designed in such a way that it combines a branch of identical layers of fast elements (Branch −1) and a branch of identical layers of slow elements (Branch 1) with set or variable degrees of probability. In this embodiment, the coupling in Branch −1 is identical and independent to the coupling in Branch 1.

In one embodiment, the pattern recognition device 10 constrains a network 12 of nonlinear, coupled oscillators configured such that the network self-organizes and alters the coupling constants as to influence future network outputs. This approach may be achieved by bottlenecking information flows within the network (as shown in FIGS. 3 and 4) such that the dimensionality of each layer is reduced, with the final layer representing the number of generative classes within the data. By coupling in a correct label via a one-hot encoding (i.e. 01, 10) or via a vector of the label probability distribution, the coupled network 12 will settle into the correct answer and induce state changes in the elements 14. This approach has the advantage of mapping well to existing machine learning techniques.

The pattern recognition device 10 can be used in many different operating environments and, accordingly, has many different embodiments. For example, in one embodiment, the detected pattern is an optical image and the environmental condition input 20 comprises optical data. In some embodiments, the nonlinear dynamic elements 14 may be coupled ferromagnetic or ferroelectric elements for detecting magnetic or electric fields. In other embodiments the nonlinear dynamic elements 14 are coupled SQUIDs. In other embodiments, the dynamic elements 14 may be multiferroic-based magnetic or humidity sensors, or constituent parts of an environmental sensor.

Figure 6:
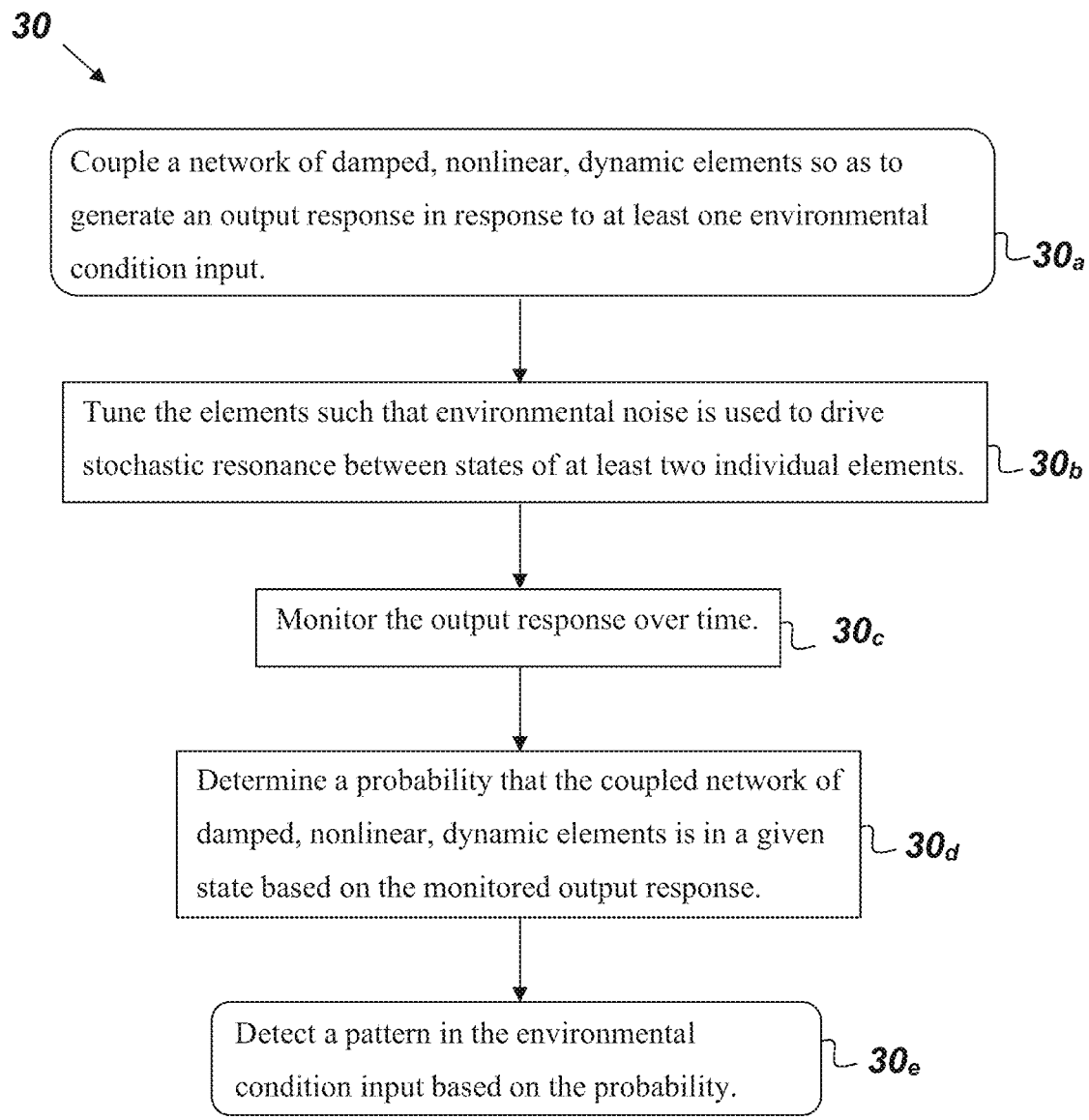
FIG. 6 is a flowchart of a method for recognizing a pattern amidst environmental noise.

FIG. 6 is a flowchart of a method 30 for recognizing a pattern amidst environmental noise comprising the following steps. The first step $30_a$ provides for coupling a network of damped, nonlinear, dynamic elements so as to generate an output response in response to at least one environmental condition. Each element has an associated multi-stable potential energy function that defines multiple energy states of an individual element. The next step $30_b$ provides for tuning the elements such that environmental noise is used to drive stochastic state changes of individual elements. The next step $30_c$ provides for monitoring the output response over time. The next step $30_d$ provides for determining a probability that the coupled network of damped, nonlinear, dynamic elements is in a given state which may represent the particular pattern to be recognized based on the monitored output response. The next step $30_e$ provides for detecting a pattern in the environmental condition input based on the probability. The coupled network of damped, nonlinear, dynamic elements may be configured to operate within a parameter space of stochastic resonance between energy levels of at least two elements. It should be noted that the output may itself change over time in a specific way comprising the most probable state—i.e. the most probable state may in fact be a time varying sequence of most probable states.

Figure 7:
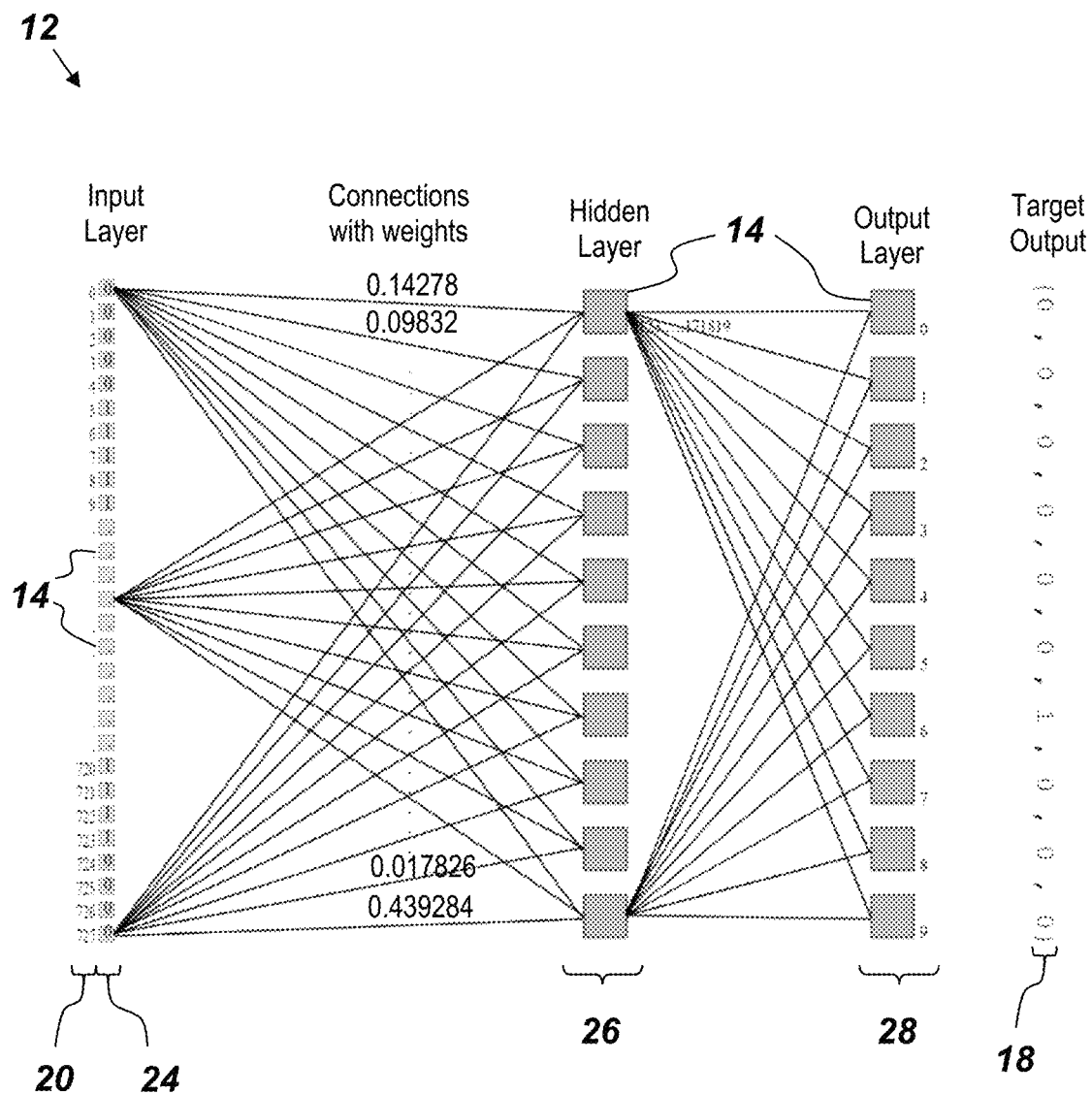
FIG. 7 is a block diagram of a coupled network of nonlinear dynamic elements.

FIG. 7 is a block diagram of a feed-forward, two-layer neural network embodiment of the coupled network 12 that consists of an input layer 24 of dynamic elements 14, a hidden layer 26 of dynamic elements 14, and an output layer 28 of dynamic elements 14. In this embodiment, the dynamic elements 14 are opamp devices and the environmental condition input 20 is data from the modified National Institute of Standards and Technology (MNIST) dataset. In this embodiment, there are n by m inputs, x elements in the hidden layer 26 and y elements in the output layer 28. Each layer in turn can be interconnected using non-linear coupling.

Figure 8:
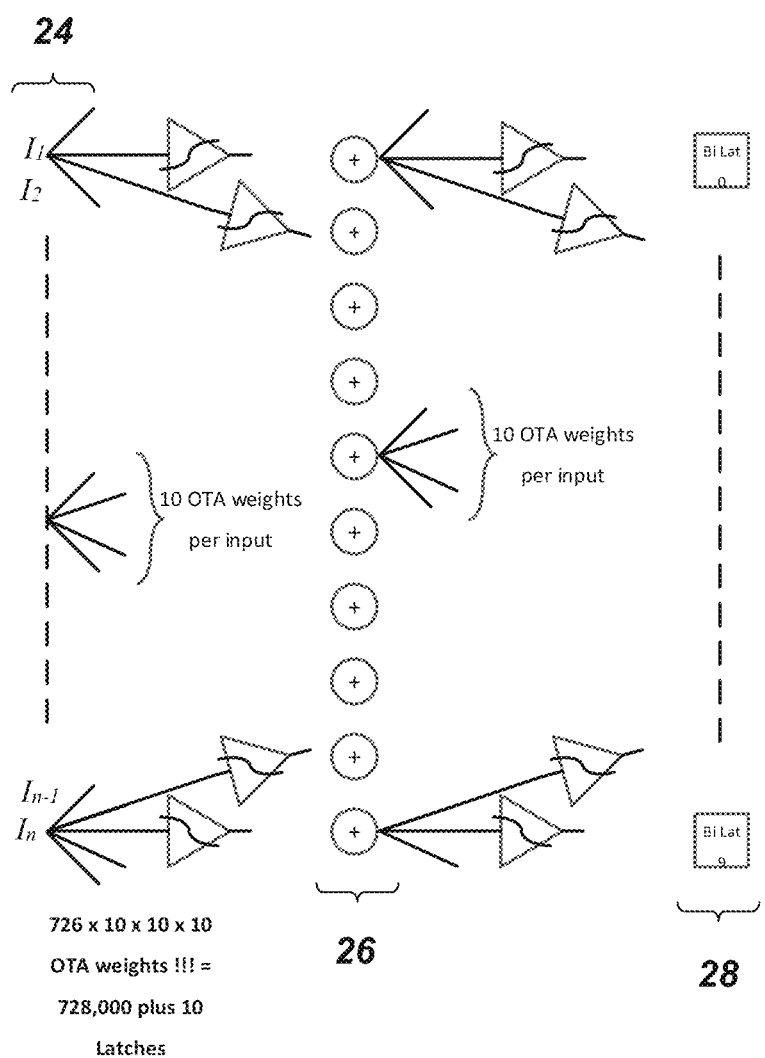
FIG. 8 is a block diagram of a coupled network of nonlinear dynamic elements.

FIG. 8 is a block diagram of an embodiment of the coupled network 12 comprising an input layer 24 of dynamic elements 14, at least one hidden layer 26 of dynamic elements 14, and an output layer 28 of dynamic elements 14. In this embodiment, the dynamic elements 14 in the input layer 24 are operational transconductance amplifiers (OTAs) connected in parallel with the dynamic elements 14, which are also OTAs, in the hidden layer 26. The output layer 28 in this embodiment comprises at least two latches, or flip-flops. The OTAs in the hidden layer 26 are in turn interconnected to at least two latches with hysteresis and/or Schmitt trigger latches or additional weight layers preceding the latches in the output layer 28. The latch element is used to sum the weighted outputs of two more OTAs and perform binary switching using predefined and/or learned hysteresis functions settings of saturated voltages or logic levels. Latch, Schmidt triggered or weight values are controlled by the distribution of currents within the die. OTA weights are described as follows:

$$I_{wt} = I\tanh\left(\frac{V_{id}}{2nU_T}\right) \pm Inoise \pm Ios \quad \text{(Eq. 7)}$$

$$I_{wt} = I\tanh\left(\frac{V_{id}}{2nU_T}\right) \pm \frac{1}{nU_T\sqrt{3C_L}} \pm \frac{IAVT}{nU_T\sqrt{WL}} \quad \text{(Eq. 8)}$$

Where; I is the bias current applied to MOSFET, $M_{5b}$, $nU_T$ is the subthreshold slope resulting from the processes and the thermal voltage, AVT is the Pelgrom coefficient, W and L are the transistor geometries associated with MOSFET, $M_1$ and MOSFET, $M_3$, $C_L$ is the total load capacitance, and $V_{id}$ is the applied input voltage. It is assume the OTA is biased with at least 12 to 24 thermal voltages.

Figure 9:
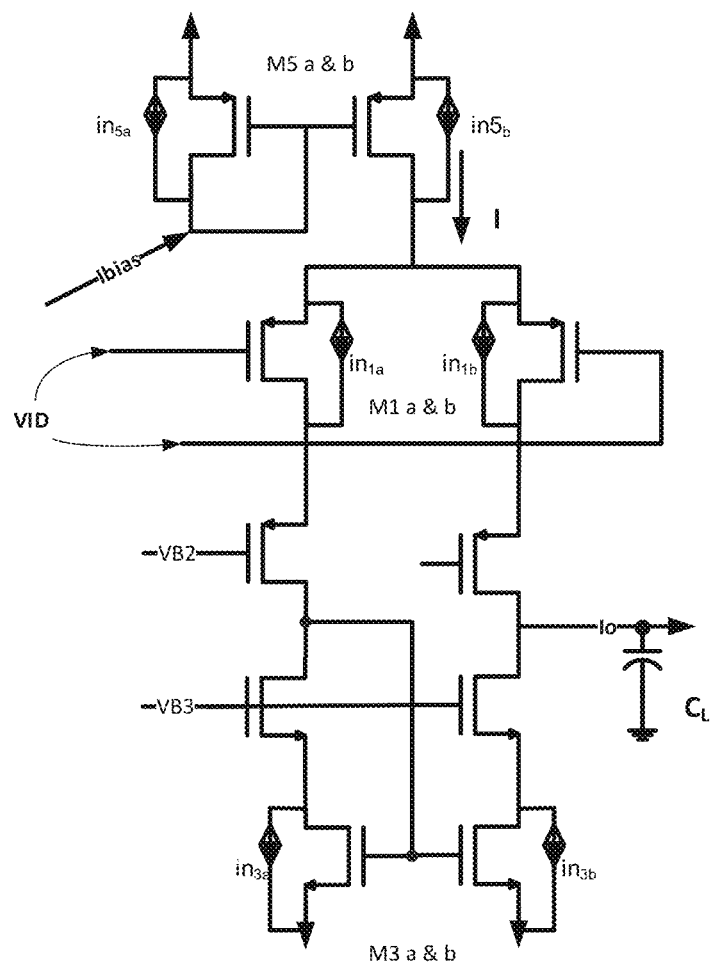
FIG. 9 is a circuit diagram.

FIG. 9 is a circuit diagram of an embodiment of a telescopic cascaded OTA. The OTA (weight) is a nonlinear amplifier element that takes in the voltage ($V_{id}$=x) applies gain $I_{wt}$ and resulting the amplified output signal by xY until saturated by the tan h function of the weight. Op-amps ideally have an output current of zero exclusive of device offset due to mismatch and thermal noise. Observe the saturation nonlinearity produced by the tan h function in $V_{id}$=x. tan h saturation levels are set by the bias current I which may take on a fixed or programmable or learned magnitude. The non-linearity occurs when a sum of two or more op-amp elements connected to the latching Schmidt with hysteresis or weak latch elements. Noise sources are represented in FIGS. 9 and 10 by diamond-shaped features.

Figure 10:
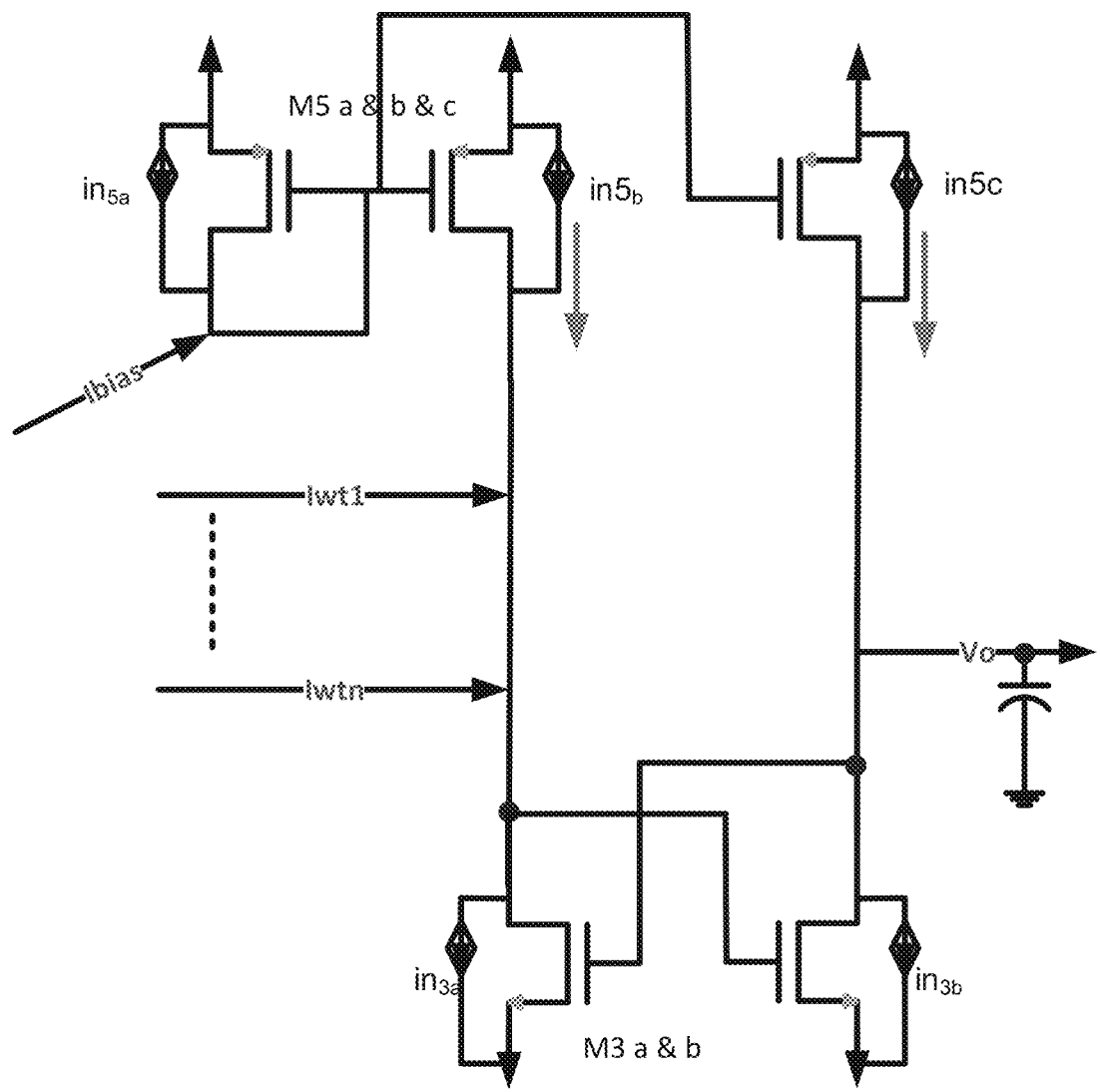
FIG. 10 is a circuit diagram.

FIG. 10 is a circuit diagram of a current programmable weak latch. Weak latches behave similar to Schmitt trigger latches are described as follows:

$$\sum_1^n I_{wtn} = I\tanh\left(\frac{V_{idn}}{2nU_T}\right) \pm Inoise \pm Ios > I_{Lat} \to Vo = 0 \quad \text{(Eq. 9)}$$

$$\sum_1^n I_{wtn} = \quad \text{(Eq. 10)}$$

$$I\tanh\left(\frac{V_{idn}}{2nU_T}\right) \pm \frac{1}{nU_T\sqrt{3C_L}} \pm \frac{IAVT}{nU_T\sqrt{WL}} > I_{Lat} \to Vo = 1$$

$$\frac{dv1}{dt} = -G_1 \cdot v_1 + I_{11} \cdot \tanh(v_1) + I_{12} \cdot \tanh(v_2) + I_{13} \cdot \tanh(v_3) \quad \text{(Eq. 11)}$$

$$\frac{dv2}{dt} = -G_2 \cdot v_2 + I_{21} \cdot \tanh(v_1) + I_{22} \cdot \tanh(v_2) + I_{23} \cdot \tanh(v_3) \quad \text{(Eq. 12)}$$

$$\frac{dv3}{dt} = -G_3 \cdot v_3 + I_{31} \cdot \tanh(v_1) + I_{32} \cdot \tanh(v_2) + I_{33} \cdot \tanh(v_3) \quad \text{(Eq. 13)}$$

Equations 9-13 above may be converted to a matrix and generalized as follows:

$$\frac{dv1}{dt} = \quad \text{(Eq. 14)}$$
$$-G_1 \cdot v_1 + I_{11} \cdot \tanh(v_1) + \cdots + I_{1(n-1)} \cdot \tanh(v_{n-1}) + I_{1n} \cdot \tanh(v_n)$$

$$\frac{dv2}{dt} = \quad \text{(Eq. 15)}$$
$$-G_2 \cdot v_2 + I_{21} \cdot \tanh(v_1) + \cdots + I_{2(n-1)} \cdot \tanh(v_{n-1}) + I_{3n} \cdot \tanh(v_n)$$

$$\frac{dvn}{dt} = \quad \text{(Eq. 16)}$$
$$-G_n \cdot v_n + I_{n1} \cdot \tanh(v_1) + \cdots + I_{n(n-1)} \cdot \tanh(v_{n-1}) + I_{nn} \cdot \tanh(v_n)$$

From the above description of the pattern recognition device 10, it is manifest that various techniques may be used for implementing the concepts of the pattern recognition device 10 without departing from the scope of the claims. The described embodiments are to be considered in all respects as illustrative and not restrictive. The method/apparatus disclosed herein may be practiced in the absence of any element that is not specifically claimed and/or disclosed herein. It should also be understood that the pattern recognition device 10 is not limited to the particular embodiments described herein, but is capable of many embodiments without departing from the scope of the claims.

We claim:

1. A pattern recognition device comprising:
a coupled network of damped, nonlinear, dynamic elements configured to generate an output response in response to at least one environmental condition, wherein each element has an associated multi-stable potential energy function that defines multiple energy states of an individual element, and wherein the elements are tuned such that environmental noise triggers stochastic resonance between energy levels of at least two elements;
a processor configured to monitor the output response over time, to determine a probability that the pattern recognition device is in a given state based on the monitored output response over time, and to detect a pattern in the at least one environmental condition based on the determined probable state of the pattern recognition device.

2. The pattern recognition device of claim 1, wherein the output response is generated by a subset of elements in the coupled network of damped, nonlinear, dynamic elements.

3. The pattern recognition device of claim 1, wherein the detected pattern is an optical image and the environmental condition is optical data.

4. The pattern recognition device of claim 1, wherein the coupled network comprises layers of n×m arrays, wherein one of the layers is an input layer and one of the layers is an output layer, and wherein each dynamic element in a given layer is coupled to one or more of the dynamic elements of a subsequent n×m array layer.

5. The pattern recognition device of claim 4, wherein the coupled network further comprises a hidden layer of dynamic elements coupled between the input layer and the output layer, wherein the hidden layer is tuned to a learned, or previously predefined, Schmitt trigger giving the pattern recognition device at least one quasi-stable state so as to give the coupled network a feed forward direction.

6. The pattern recognition device of claim 5, wherein the layers of the damped, nonlinear, dynamic elements are are selectively and sequentially layered and coupled such that some layers behave nonlinearly as fast neurons and other layers behave nonlinearly as slow neurons in a biological system.

7. The pattern recognition device of claim 1, wherein the coupled network comprises a plurality of connected layers of damped, nonlinear, dynamic elements coupled together in a latching configuration, wherein the plurality of connected layers comprises an input layer and an output layer.

8. A sensor comprising:
a coupled network of damped, nonlinear, dynamic circuit elements configured to generate an output signal in response to at least one environmental condition, wherein each circuit element has an associated multi-stable potential energy function that defines multiple energy states of an individual circuit element, and wherein the circuit elements are tuned such that environmental noise triggers stochastic resonance between energy levels of at least two circuit elements; and
a processor configured to monitor the output signal over time and to determine a probability that the sensor is in a given state based on the monitored output signal.

9. The sensor of claim 8, wherein the environmental noise is thermal noise.

10. A method for recognizing a pattern amidst environmental noise comprising the following steps:
coupling a network of damped, nonlinear, dynamic elements so as to generate an output response in response to at least one environmental condition input, wherein each element has an associated multi-stable potential energy function that defines multiple energy states of an individual element;
tuning the elements such that environmental noise is used to drive stochastic resonance between states of at least two individual elements;
monitoring the output response over time;
determining a probability that the coupled network of damped, nonlinear, dynamic elements is in a given state based on the monitored output response; and
detecting a pattern in the environmental condition input based on the probability.

11. The method of claim 10 wherein the coupled network of damped, nonlinear, dynamic elements is configured to operate within a parameter space of stochastic resonance between energy levels of at least two elements.

12. The method of claim 10, wherein the step of monitoring the output response over time includes observing temporal responses at any individual element or group of elements within the coupled network of damped, nonlinear, dynamic elements.

13. The method of claim 10, wherein the coupling step further comprises coupling a network of damped, nonlinear, dynamic elements so as to generate an output response in response to an environmental condition such that the coupling exhibits Hebbian behavior in response to inputs.

14. The method of claim 10, wherein the inputs include components that are selected from a group consisting of: time-dependent deterministic and non-deterministic components.

15. The method of claim 10, wherein the inputs are signals selected from a group consisting of: optical, audio, electromagnetic, and mechanical input signals.

16. The method of claim 15, wherein the elements are oscillators.

17. The method of claim 16, wherein each oscillator is an active semi- conducting device selected from the group consisting of: chemical, electrical, optical, magnetic, and biological elements.

18. The method of claim 10, wherein the network of damped, nonlinear, dynamic elements is driven by native, thermal noise.

19. The method of claim 10, wherein the network of damped, nonlinear, dynamic elements is driven artificially by a externally-generated noise source with a time-varying amplitude.

20. The method of claim 10, wherein the network of damped, nonlinear, dynamic elements is tuned by adjusting weighting factors through an act selected from the group consisting of: modification of circuit resistances or biases on a semiconductor device, altering of magnetic coupling between dynamic elements, and varying of a quantum mechanical coupling between dynamic elements such as are seen in a superconducting circuit.

* * * * *